May 1, 1962 A. L. HERRMANN 3,032,286
WINDING AND REELING MECHANISM
Filed Oct. 13, 1959 2 Sheets-Sheet 1

Adolf L. Herrmann,
INVENTOR.

BY S. J. Rotondi,
A. T. Dupont, and
W. P. Murphy

May 1, 1962     A. L. HERRMANN     3,032,286

WINDING AND REELING MECHANISM

Filed Oct. 13, 1959     2 Sheets-Sheet 2

Adolf L. Herrmann,
*INVENTOR.*

BY S. J. Rotondi,
A. T. Dupont, and
W. P. Murphy

United States Patent Office 3,032,286
Patented May 1, 1962

3,032,286
WINDING AND REELING MECHANISM
Adolf L. Herrmann, 1206 Locust Ave. SE.,
Huntsville, Ala.
Filed Oct. 13, 1959, Ser. No. 846,216
8 Claims. (Cl. 242—55.14)
(Granted under Title 35, U.S. Code (1952), sec. 266)

The invention described herein may be manufactured and used by or for the Government for governmental purposes without the payment of any royalty thereon.

This invention relates to a winding and reeling mechanism. More particularly, the invention pertains to such a mechanism which enables the proper tape tension to be maintained in tape recorders or similar devices.

In the use of tape recorders, there is a need for a mechanism to automatically tension the tape. Also, there is a need for a mechanism which will eliminate tearing of the tape drive perforations, due to excessive tension when toothed sprockets are used. There is a further need for a mechanism which will eliminate the possibility of the tape's slipping on the drive sprocket, due to low tension, causing the tape to wind loosely on the reels and not fill them to capacity.

In view of these facts, an object of this invention is to provide a mechanism that eliminates tearing of the tape perforations, by sprocket teeth, due to high tension on the tape.

Another object of this invention is to provide a tensioning mechanism which will eliminate slipping of the tape on the drive sprocket due to low tension on the tape.

A further object of this invention is to provide a tensioning mechanism that will automatically apply the correct tension to a tape, thereby insuring a properly filled reel.

The foregoing and other objects of this invention will become more fully apparent from the following detailed description of the embodiment of the invention and from the accompanying drawings, in which.

Figure 1:
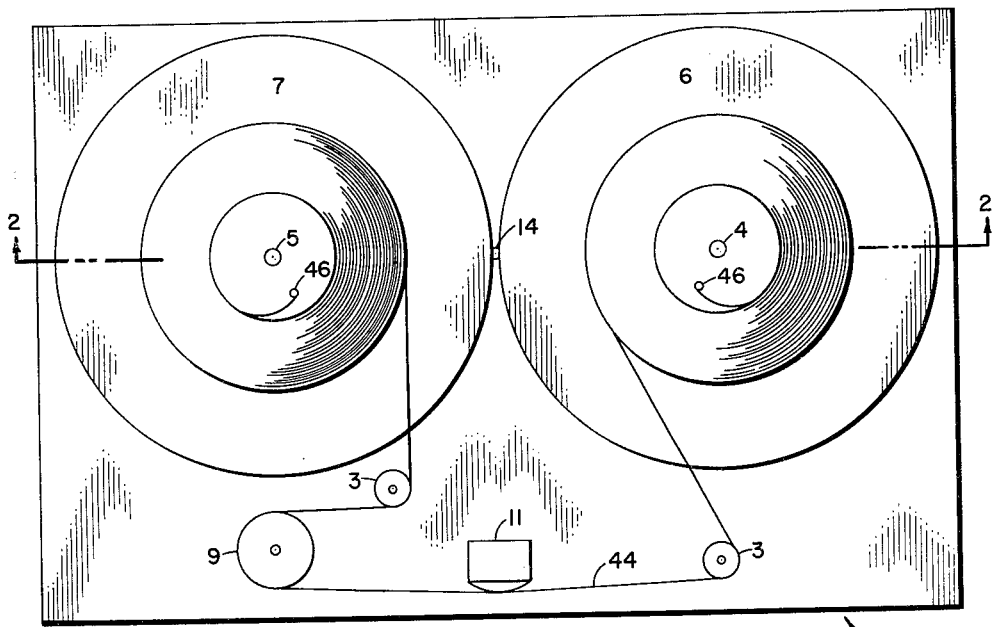
FIGURE 1 is a plan view, with part of each reel removed, of a tape recorder or similar device, which incorporates the tensioning mechanism.
Figure 2:
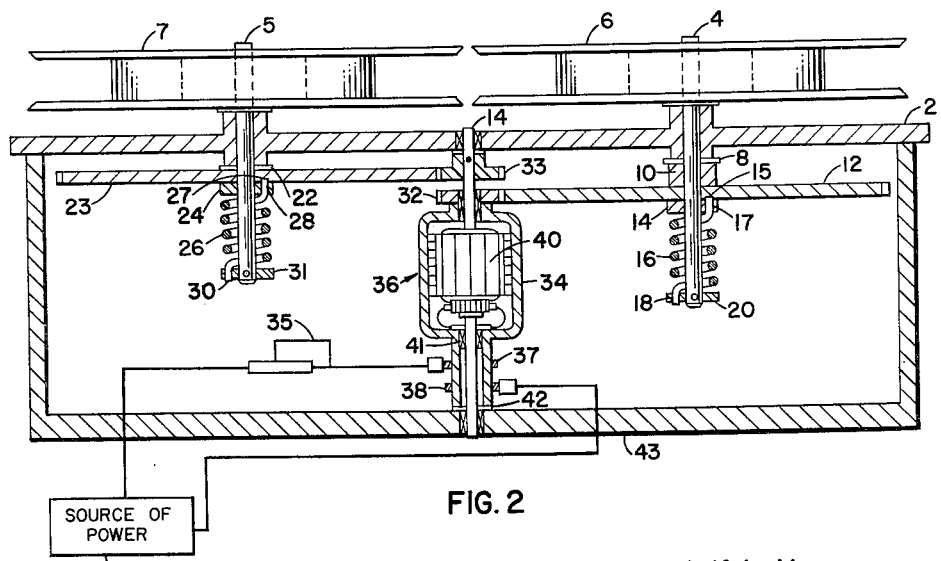
FIGURE 2 is a sectional view from line 2—2 of FIGURE 1.

In the drawings, wherein for the purpose of illustration there is shown a preferred embodiment of the invention, the numeral 1 designates a tape recorder or similar device. The recorder has a plate 2 adapted to receive a pair of shafts 4 and 5, a pair of guide rollers 3, a reversible tape drive 9 and a recording head 11, as shown in FIGURES 1 and 2. The tape-driving mechanism 9 comprises a reversible, synchronous motor and a sprocket or pulley, driven by the motor, and drivingly engaging tape 44.

One end of each of the shafts 4 and 5 is adapted to receive a reel, 6 or 7, respectively. The other end of shaft 4, beneath plate 2, is adapted to receive a flat washer 8, a spacer 10, a gear 12 fitted onto shaft 4 adjacent spacer 10, a retainer ring 14 abutting gear 12, and a tension spring 16 having one end secured in recess 15 and aperture 17 of gear 12 and ring 14 and the other end secured in an aperture 18 in a second retainer ring 20, which is secured to shaft 4.

The other end of shaft 5, beneath plate 2, is adapted to receive a flat washer 22, a gear 23, which is fitted onto shaft 5, a retainer ring 24 abutting gear 23, and a tension spring 26 having one end secured in recess 27 and aperture 28 of gear 23 and retainer ring 24 and the other end secured in an aperture 30 in a second retainer ring 31, which is secured to shaft 5.

Gears 12 and 23 are adapted to mesh with gears 32 and 33, respectively. Gear 32 is secured to the rotatable housing 34 of a differential electromotive device 36, of less power than the motor of drive 9. Housing 34 contains a reduced portion, near its base, adapted to receive a pair of electrical slip ring contacts 37 and 38. These contacts are connected thru a variable resistor 35 to a source of power 39. Whereas gear 32 is free to turn on the electromotive device's armature 40, gear 33 is keyed or otherwise secured to said shaft. The portion of the armature shaft above gear 33 is journaled in plate 2, and the portion below gear 33 is journaled in housing 34.

The other end of the armature shaft extends thru bearing 41 in the reduced portion of the housing, thru a thrust bearing 42 and at its bottom is journaled in a radial bearing in electromotive device mounting plate 43.

The operation of this embodiment is as follows:

Each end of tape 44 is secured to a fastening pin 46 on reels 6 and 7, and the tape is placed on the reels, so that, for example, reel 7 is full and reel 6 empty. Differential electromotive device 36 is started; housing 34 is rotated due to reaction on it from the torque on armature 40, thus transmitting torque thru gear 32 to gear 12; and armature 40 transmits torque thru gear 33 to gear 23. These torques cause the gears to rotate until all the slack is removed from the tape. When the slack is removed, springs 16 and 26 are tensioned, and electromotive device 36 is temporarily stalled.

With the electromotive device thus stalled, variable resistor 35 is adjusted, causing the torque of electromotive device 36 to change, with corresponding alteration of the torsion of springs 16 and 26, until the desired tension on the tape is obtained. Then tape drive 9 is switched on, so that the tape moves from left to right. Throughout the movement of tape, electromotive device 36 maintains the preset torsion of springs 16 and 26 thru its oppositely moving housing and armature, thereby insuring continuous tension on the tape.

This movement of the tape rotates reel 7 in a clockwise direction, while the torque supplied by armature shaft 40 acts in opposition to this rotation, thereby maintaining tension in the tape between reel 7 and tape drive 9. As the tape is fed from tape drive 9 it is taken up by reel 6, which is being driven by the rotation of the housing 34, thru gears 32 and 12. Filling of reel 6 (the take-up reel in this example) is accomplished due to the tension (explained above) applied to the reel by housing 34. The housing rotates as tape is fed from reel 7 by tape drive 9, so as to maintain the tension applied to the tape by adjustment of resistor 35, thereby driving the take-up reel 6 thru gears 32 and 12, and spring 16.

Filling of reel 6 with tape continually decreases its angular speed (due to the fact that the circumference of the tape on the reel is increasing), and simultaneously the angular speed of reel 7 is being increased, until reel 6 is wound with the same amount of tape as reel 7 (both reels then having, for the moment, equal amounts of tape with equal tape circumferences). When the reels thus have the same amounts of tape and equal tape circumferences, their angular speeds are the same. Then, as the tape circumferences continue to change, the angular speeds of the reels correspondingly change, so that reel 7 is now turning faster than reel 6. This variance of angular speed between the reels is made possible by operation of the electromotive device 36, thru its housing and armature, which undergo the necessary changes in their rotational speeds for maintaining the torsion on springs 16 and 26. Once the amount of torque is set, it will remain constant, regardless of the direction of reversible motor drive 9 and of the tape. Since movement of the electromotive device is determined by movement of reels 6 and 7 (when the reels rotate, the armature and housing rotate simultaneously in order to maintain the torque applied to the reels) changes in angular speed of the reels is permitted without slack in the tape. These changes are due to the housing and armature of the electromotive device maintaining a constant torque on the tape, thru the reels. This torque rotates the take-up reel and maintains a torque on the feed reel as it is rotated by the tape passing over tape drive 9. The differential gearing which permits the changes in angular speed comprises gear 33, which is fixed to armature shaft 40, and gear 32 which is fixed to housing 34. The torque between housing 34 and armature 40 is less than the torque of tape-driving means 9, so that element 9 is able to override the torque of the differential electromotive device. These gears coact with the housing and armature (as explained above) when the angular speed of the reels is changed, due to changes in the amount of tape on each reel. When the reels are rotating and contain different amounts of tape, their angular speeds are different under these conditions, the gears are turned by the electromotive device (its housing and armature) at different speeds. The principle of this differential motor may be compared to a coil spring that is being loaded and unloaded, because at one time it is absorbing power and at another time it is releasing power.

When power to the motor is temporarily cut off, springs 16 and 26 solve the problem of keeping the tape under tension. This is done by the springs's absorbing several revolutions of the motor and storing this energy until the torque in the springs is equal to that developed by device 36. This operation of the springs is like an elastic coupling between the gears and reel shafts, since they will turn clockwise or counter-clockwise with the reel shafts.

When device 36 is turned on, its oppositely rotating housing and armature first take up any slack in the tape and then wind both springs 16 and 26, so that they store energy which becomes equal to the torque of motor 36. This enables a quick start of the tape when the recorder is turned on, since the springs are still partially loaded.

Figure 3:
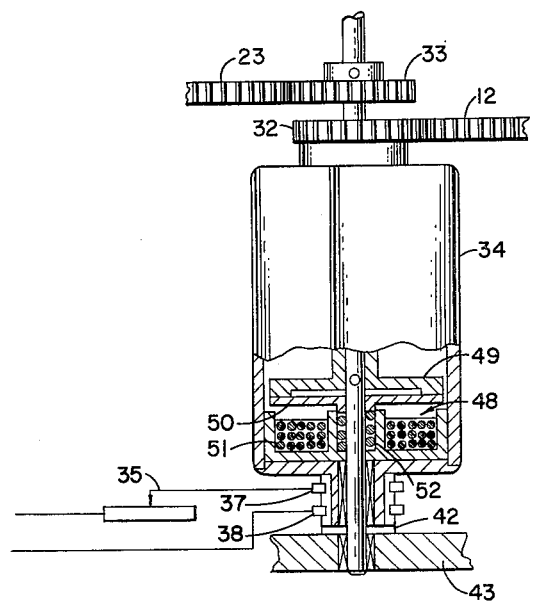
FIGURE 3 is a view, partly broken away, of an electromotive device utilizing a magnetic friction brake, which is suitable for replacement of the electromotive device shown in FIGURE 2.
Figure 4:
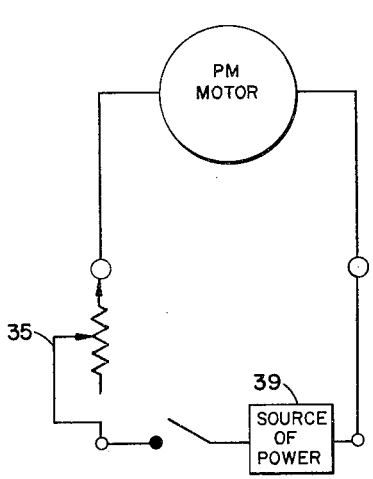
FIGURE 4 is a wiring diagram suitable for use with the electromotive device of FIGURE 2.
Figure 5:
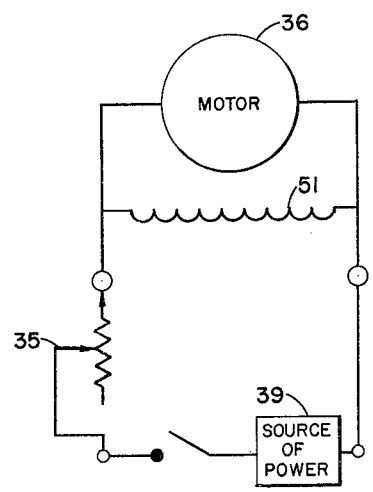
FIGURE 5 is a wiring diagram suitable for use with the electromotive device of FIGURE 3.

After the recorder and electromotive device 36, have been turned off, the springs will try to unload their tension. Since the tape is connected between the reels the springs will consequently try to unload thru electromotive device 36, but this can be stopped in a number of ways. One way, shown in FIGURES 2 and 4, and heretofore generally described comprises a direct current permanent-magnet motor whose permanent magnetic field acts as a friction brake between the housing and armature. Another means would be to use an electromotive device with a magnetic friction brake 48 such as is shown in FIGURES 3 and 5. Said brake comprises two relatively reciprocal brake plates 49 and 50, reciprocating coil 51 and spring 52.

When electromotive device 36 is energized coil 51, being also energized, withdraws plate 50 from contact with plate 49, thus allowing device 36 to function. When device 36 and coil 51 are deenergized spring 52 forces friction plates 49 and 50 together.

The D.C. permanent magnet electromotive device may be replaced with an alternating-current electromotive device.

It is to be understood that the form of the invention that is herein shown and described is the preferred embodiment, and that various changes in the shape, size and arrangement of parts may be resorted to without departing from the spirit of the invention, or the scope of the subjoined claims.

The following invention is claimed:

1. A winding and reeling mechanism comprising: an upper mounting plate, provided with an aperture near its center; a lower mounting plate attached to said upper plate, provided with an aperture in alignment with said first-named aperture; a pair of parallel shafts rotatably supported by said upper plate; a reel attached to each shaft; a tape having one of its ends fixed to each of said reels; rollers, supported by said upper plate, for guiding said tape; reversible powered means, supported by said upper plate, for driving said tape; recording means in contact with said tape; a differential tape-tensioning electromotive device supported by said lower mounting plate, comprising a rotatable housing, a thrust bearing for said housing, supported by said lower mounting plate, bearings supported by said housing, bearings supported in said apertures, a rotatable armature having its shaft journaled, intermediate its ends, in said housing-supported bearings and having its ends fitted in said bearings in said apertures, and a pair of electrical slip ring contacts on said housing; a gear secured to said armature shaft juxtaposed to said upper mounting plate; a second gear secured to said rotatable housing below said first gear; a gear positioned on one of said parallel shafts, and meshed with said gear that is secured to said armature shaft; a torsion spring rotatably connecting said one shaft and said last-named gear; a bearing positioned on the other parallel shaft; a spacer abutting said last-named bearing on said shaft; a gear positioned in abutment with said spacer on said other parallel shaft, and in alignment with and meshed with said housing-fixed gear; a second torque torsion spring rotatably connecting said other shaft and said gear in abutment with said spacer; a variable resistor connected to said contacts; a source of power connected to said contacts thru said resistor, whereby torque of said motor may be adjusted until a desired tension is applied to said tape.

2. A winding and reeling mechanism comprising: a support provided with an aperture; a plate attached to said support and provided with an aperture in alignment with said first-named aperture; a pair of parallel shafts carried by said support; a reel attached to each of said shafts; a flexible band fixed to said reels; reversible powered means for driving said band; recording means in contact with said band; bearings in said apertures; differential means comprising an electromotive device with a rotatable housing and a rotatable armature having its shaft journaled in said bearings; a pair of electrical contacts electrically connected to said device; means rotatably coupling said differential means and said reels; a resilient tensioning means connected between each of said parallel shafts and said coupling means; means adapted to vary the torque of said differential means; means for maintaining tension on said band after said device is switched off; a source of power connected to said device thru said torque-varying means and said electrical contacts; whereby tension on said tape may be adjusted by means of the torque-varying means.

3. A winding and reeling mechanism as set forth in claim 2, in which said differential means further comprises a gear secured to said rotatable housing and a gear secured to said rotatable armature.

4. A winding and reeling mechanism as set forth in claim 3, in which said electrical contacts comprise a pair of slip rings mounted on said rotatable housing.

5. A winding and reeling mechanism as set forth in claim 3, in which said coupling means comprises a gear fitted on each of said parallel shafts and in mesh with said last-named gears.

6. A winding and reeling mechanism as set forth in claim 2, in which said resilient tensioning means comprises a pair of torsion springs capable of producing torques when said reels are rotated in either direction.

7. A winding and reeling mechanism as set forth in claim 2, in which said torque-varying means comprises a variable resistor.

8. A winding and reeling mechanism as set forth in claim 2, in which said means for maintaining tension on said band after said device is switched off comprises a magnetic friction brake.

References Cited in the file of this patent

UNITED STATES PATENTS

| 2,012,208 | Wildy | Aug. 20, 1935 |
| 2,954,939 | Herrmann | Oct. 4, 1960 |

FOREIGN PATENTS

| 313,672 | Great Britain | June 20, 1929 |
| 688,696 | France | May 19, 1930 |
| 627,307 | Great Britain | Aug. 5, 1949 |